E. M. REID.
TIRE.
APPLICATION FILED DEC. 20, 1917. RENEWED MAR. 15, 1919.

1,302,091.

Patented Apr. 29, 1919.
2 SHEETS—SHEET 1.

Witnesses

Inventor
E. M. Reid

By
Attorneys

E. M. REID.
TIRE.
APPLICATION FILED DEC. 20, 1917. RENEWED MAR. 15, 1919.
1,302,091.
Patented Apr. 29, 1919.
2 SHEETS—SHEET 2.
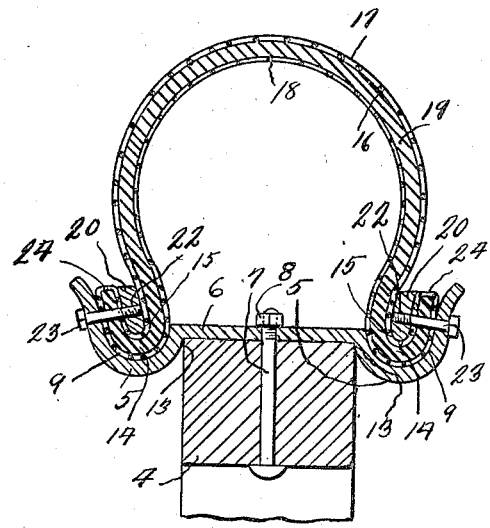
Fig. 2.
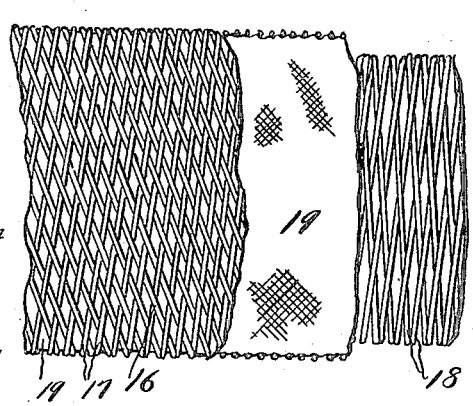
Fig. 3.
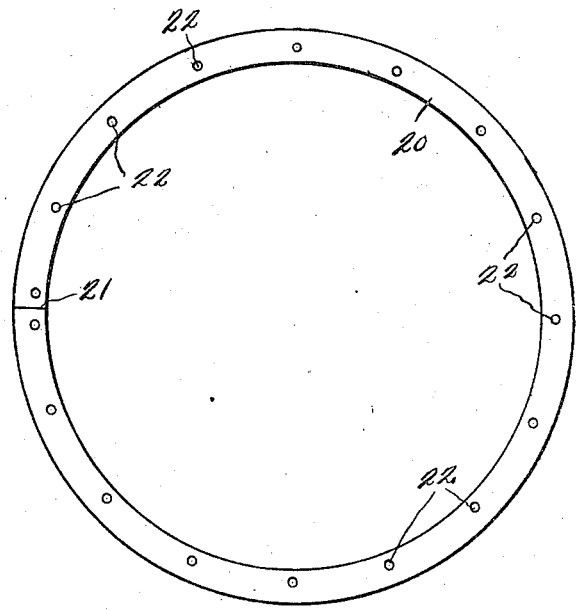
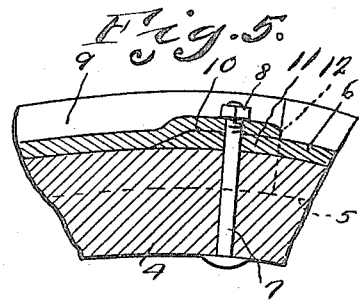
Fig. 5.
Fig. 4.
Witnesses
Philip Ferrell
Francis L. Powell
Inventor
E. M. Reid
By D. Swift & Co.
Attorneys

UNITED STATES PATENT OFFICE.

ELDRO M. REID, OF POCATELLO, IDAHO.

TIRE.

1,302,091. Specification of Letters Patent. Patented Apr. 29, 1919.

Application filed December 20, 1917, Serial No. 208,061. Renewed March 15, 1919. Serial No. 282,943.

*To all whom it may concern:*

Be it known that I, ELDRO M. REID, a citizen of the United States, residing at Pocatello, in the county of Bannock, State of Idaho, have invented a new and useful Tire; and I do hereby declare the following to be a full, clear, and exact description of the invention, such as will enable others skilled in the art to which it appertains to make and use the same.

This invention relates to an improved tire more especially designed for use on automobile wheels, and one of the objects of the invention is to provide a simple, improved and practical tire, which may be manufactured for a small cost and sold at a reasonable profit.

A further object of the invention is to provide a tire, especially designed to eliminate pneumatic tubes and the like.

A further object of the invention is the provision of an improved tire, consisting of an outer spring steel wire mesh of a heavy gage and an inner spring steel wire mesh of a lighter gage, there being a casing or filling of a composition of canvas and rubber in between the spring steel wire meshes. This structure of tire insures rigidity and stability, and yet at the same time allows a yielding action, sufficient to fulfil the requirements for an automobile wheel.

A further object of the invention is the provision of an improved rim mounted upon the felly of the wheel for supporting the tire in position securely, there being means to fasten the tire to said rim.

A further object of the invention is the provision of means for securing the rim to the felly whereby lateral displacement of the rim is prevented.

In practical fields the details of construction may necessitate alterations falling within the scope of what is claimed.

The invention comprises further features and combination of parts as hereinafter set forth shown in the drawings and claimed.

In the drawings:—

Fig. 2 is an enlarged sectional view on line 2—2 of Fig. 1.

Fig. 3 is a plan view of a section or a portion of the tire, showing parts broken away, to show the inner and outer spring steel wire meshes and the intermediate filling of canvas and rubber.

Fig. 4 is a detail view in side elevation of a severed ring designed for use in holding one side of the tire to the rim.

Fig. 5 is a detail sectional view of a portion of the felly of the wheel, showing the overlapping ends of said rim.

Figure 1:
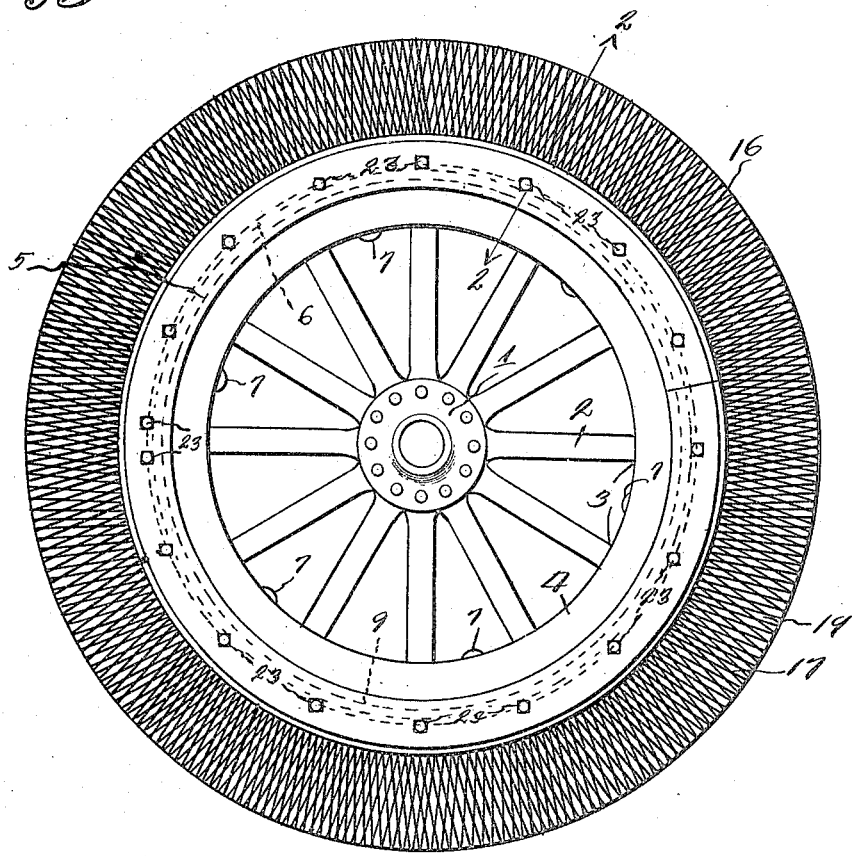
Figure 1 is a view in side elevation of an automobile wheel showing the improved tire as applied thereto.

Referring more especially to the drawings 1 designates a hub, and 2 the spokes, which are connected at 3 to a conventional form of felly 4. A metallic rim 6 fits the felly 4, there being bolts 7 passing through the felly and the rim and provided with nuts 8, for securing the rim to the felly. The side portions of the rim 6 merge into integral curved portions 5, which curve toward the center of the wheel, laterally, and then substantially radially outwardly, thereby providing channel flanges 9. In order to fit the rim 6 to the felly of the wheel, it is separable at a certain point, and one of the separable ends is constructed to provide an undershaped or formed recess 10, while the other end of said rim has an extension 11 to engage said recess 10, thereby overlapping the separable ends of the rim 6. Where the separable ends overlap, the channel flanges 9 of the end having the extension 11 are cutaway as shown at 12 to abut the channel flanges of the end having the recess 10. By means of the channel flanges 9 being curved in a direction somewhat toward the axial center of the wheel and laterally suitable means is provided to substantially abut the opposite sides of the felly as shown at 13, to prevent lateral displacement of said rim 6, the bolts 7 also assist materially in this regard. The tire 16 is provided with channel flanges 14, which are curved correspondingly to and fitting the channel flanges 9, as shown clearly in Fig. 2. Said flanges 14 are curved as shown to provide the channels 15, for the reception of the securing rings 20. These rings are split or severed as shown at 21, so that they may be sprung over the channel flanges 9, whereby they may enter the channels 15. Each ring 20 is provided with a plurality of apertures 22, and bolts 23 pass through the outer portions of the channel flanges 9, through the channel flanges 14 of the tire, and are threaded into the apertures or openings 22 of the ring 20 thereby securely fastening the tire on the rim. The tire 16 comprises an outer spring steel wire mesh work 17 of a yieldable heavy gage and an inner spring steel wire mesh work 18 of a yieldable lighter gage. These inner and outer wire meshes are spaced for the reception of an intermediate composition of rubber and canvas filling 19. This filling and the inner and outer meshes (which are welded or otherwise fastened together as at 24) are bent as shown to provide said channel flanges 14, to engage said channel flanges 9.

The invention having been set forth what is claimed as new and useful is:—

A tire for a wheel comprising an outer spring steel wire mesh of heavy gage, an inner spring steel wire mesh of a lighter gage, and an intermediate filling constructed of a composition of rubber and canvas.

In testimony whereof I have signed my name to this specification in the presence of two subscribing witnesses.

ELDRO M. REID.

Witnesses:
MAUDE K. BROWN,
WM. KELLY.

Copies of this patent may be obtained for five cents each, by addressing the "Commissioner of Patents, Washington, D. C."